United States Patent [19]
Arakelov et al.

[11] 3,895,423
[45] July 22, 1975

[54] MANDREL AND APPARATUS FOR MANUFACTURING MULTILAYER WINDING

[76] Inventors: Mikhail Alexandrovich Arakelov, ulitsa Oktyabrskaya, 303; Eduard Galaktionovich Gersamia, ulitsa Oktyabrskaya, 34, kv. 14; Tengiz Grigorievich Zedgenidze, prospekt 1, Chavchavadze 76; Gennady Pavlovich Nozadze, ulitsa Lenina, 76, all of Tbilisi, U.S.S.R.

[22] Filed: Aug. 10, 1973

[21] Appl. No.: 387,282

[30] Foreign Application Priority Data
Aug. 11, 1972 U.S.S.R. ............................ 1818190
Aug. 11, 1972 U.S.S.R. ............................ 1818200

[52] U.S. Cl. ........................... 29/205 D; 29/205 D
[51] Int. Cl. .......................................... H02k 15/00
[58] Field of Search .......... 29/205 D, 205 R, 205 C, 29/203 R

[56] References Cited
UNITED STATES PATENTS
3,407,473 10/1968 Rushing ........................... 29/205 D
3,407,474 10/1968 Gibbs ............................... 29/205 D
3,534,460 10/1970 Rushing ........................... 29/205 D Primary Examiner—Thomas H. Eager
Attorney, Agent, or Firm—Waters, Schwartz & Nissen

[57] ABSTRACT

The present invention relates to the manufacture of electric machines and apparatus, and more particularly, to a mandrel and an apparatus for manufacturing multilayer windings with ferromagnetic elements between the layers.

The essence of the invention resides in that a mandrel, for manufacturing multilayer windings with ferromagnetic elements between their layers, whose lateral surfaces are made up by a series of ascending steps, the number thereof being equal to the layers of the multilayer winding being manufactured, is of the magnetic type, with such a configuration and intensity of the magnetic field as to ensure reliable fixing of the ferromagnetic elements upon the lateral surfaces of the mandrel steps.

Also proposed is an apparatus including the mandrel, having mechanisms for placing or arranging the ferromagnetic elements upon the surfaces of the steps, and for assembling the winding with a subsequent molding thereof, which mechanisms alternately interact with the mandrel.

11 Claims, 17 Drawing Figures

MANDREL AND APPARATUS FOR MANUFACTURING MULTILAYER WINDING

The present invention relates to electrical engineering, in particular, to manufacturing electric machinery (e.g. motors or generators) and apparatus, and still more specifically, to a mandrel and an apparatus for manufacturing multilayer windings.

It is generally known that winding and insulating are the most labor-consuming processes in the manufacturing of electric machines. These processes are still further complicated when using layer windings. For such a machine, winding and insulating roughly account for 40 to 50 per cent of labor put into the manufacturing thereof.

In addition, these operations do not easily lend themselves to mechanization and automation.

This is due to the fact that the essential components of any electric machine or a transformer, as well as an electromagnetic drive, a magnetic amplifier and other electromagnetic apparatus, are a multilayer winding and a core of a ferromagnetic material enveloped by these multilayer windings, the windings and cores being manufactured separately, with the employment of specific technological methods for each individual design. Cores, for example, are manufactured by stamping separate plates from sheets of electrical steel, insulating these plates and assembling them into a pack, with a multilayer winding being then wound around that core. In some cases, a multilayer winding is first made by being wound around a mandrel (a permanent one in the form of a frame of an insulating material, or a technological one) and is subsequently fitted over a core.

At present, there is a trend in the construction of electric machines and apparatus to provide such designs that make it possible to simplify their manufacture by cutting down labor consumption in the manufacturing of the multilayer windings and cores of a ferromagnetic material, as well as in the process of mounting the windings upon the cores.

Known, for example, is a stator of an electric machine, wherein the effective layer consists of multilayer windings comprising ferromagnetic elements between their layers.

Each such layer with its respective ferromagnetic element constitutes a section of the effective layer of the winding. The provision of an electric machine, wherein the stator comprises multilayer windings of this type, makes it possible to dispense with the processes of stamping, slot insulation and placing the windings into slots.

In such an electric machine, it it possible to use cold-rolled grain-oriented steel which is marked by high working induction. In addition, such an electric machine makes for a practically unlimited number of phases and poles and substantially reduces the pulsation of the magnetic field in the air gap, caused by serrated harmonics.

The use in electric machines and apparatus of multilayer windings with ferromagnetic elements between the layers is hampered however, by the absence of equipment for the manufacture of such multilayer windings. On the other hand, it is practically impossible to manufacture multilayer windings with ferromagnetic elements with the aid of conventional equipment, such as different mandrels, winding machines and other apparatus used to manufacture conventional multilayer windings.

This becomes absolutely clear if one considers known equipment for manufacturing multilayer windings.

Commonly known is a mandrel for manufacturing multilayer windings in the form of a frame of an insulation material, which determines the shape of the winding to be manufactured. Such a mandrel is, in fact, part of the winding, hence, it is often referred to as a permanent mandrel.

Obviously, such a mandrel can only be used to manufacture multilayer windings consisting exclusively of conductive materials and cannot be used for manufacturing multilayer windings with ferromagnetic elements between the layers because the design of such a mandrel does not envisage the positioning thereon of the ferromagnetic elements, to say nothing of the consecutive placing of these elements in each layer in the process of continuous winding of these layers around the mandrel.

Also known is a mandrel which is commonly used for winding frameless multilayer windings; this mandrel only serves to wind multilayer windings that are removed from the mandrel after being wound. Such a mandrel is not part of the multilayer winding being manufactured, but relates to equipment meant for manufacturing the multilayer windings, for which reason it is often referred to as a technological mandrel. Such a mandrel is commonly made dismountable and consists of a base and removable lateral cheeks. The shape and geometrical dimensions of the base and the cheeks are determined by those of the multilayers winding being manufactured.

It is only natural that the manufacture of multilayer windings with the aid of the above mandrel envisages subsequent operations meant for this winding to retain the shape it has acquired in the process of being wound, for example, by impregnating the winding with an adhesive compound.

It is clear that such a mandrel cannot be used for manufacturing multilayer windings with ferromagnetic elements between their layers, for the same reasons as in the case of the previously discussed mandrel.

Finally, well known is a mandrel whose lateral surface is made up by a series of descending steps, the number thereof being equal to that of layers in the multilayer winding being manufactured. The geometrical dimensions and the shape of each step of such a mandrel correspond to those of a layer of the multilayer winding being manufactured, which is placed upon this step. Such a mandrel also relates to equipment for manufacturing multilayer windings and is often referred to as a technological mandrel.

The sequence of operations in the course of manufacturing a multilayer winding with the aid of this mandrel is as follows: first, layers of the multilayer winding are wound/each layer being wound on a step/, then the layers are assembled by being fitted one over another; finally, the multilayer winding thus obtained is impregnated with an adhesive compound, with the aid of other technological equipment designed specifically for the purpose, and molded.

Such a mandrel makes it possible to carry out a simultaneous winding of all layers of the multilayer winding being manufactured, hence, it is commonly referred to as a multi-groove mandrel.

However, the multi-step mandrel of this type cannot be used either for manufacturing multilayer windings with ferromagnetic elements between their layers. This is due to the fact that the elements cannot be positioned in this mandrel before and during the process of winding respective layers, as the mandrel cannot carry out continuous placing of coils upon ferromagnetic elements with a transfer of coils from one layer to another.

It is an object of the present invention to provide equipment which would make it possible to manufacture multilayer windings with ferromagnetic elements between their layers for electric machines and apparatus, especially in mass and serial production thereof.

According to the invention, the above object is to be attained through perfecting the known mandrel manufacturing multilayer winding, whose surface is provided with a series of descending steps, and through providing an apparatus with that perfected mandrel, which makes for a complete technological cycle of manufacturing multilayer windings with ferromagnetic elements between their layers.

Thus, a mandrel for manufacturing multilayer winding with ferromagnetic elements between layers thereof, whose lateral surface is made up by a series of descending steps, whose number is equal to that of layers of multilayer winding being manufactured, the geometrical dimensions and the shape of the lateral surface of each step corresponding to those of the layer placed upon that step, with its respective ferromagnetic element, of the multilayer winding being manufactured, is made, in accordance with the present invention, if magnetic, with a configuration and intensity of the magnetic field that ensure reliable positioning of the ferromagnetic elements upon the lateral surfaces of the mandrel steps.

It is expedient that a magnetic mandrel, for manufacturing multilayer windings with ferromagnetic elements between the layers, be made as a permanent magnet magnetized so that the configuration and intensity of the magnetic field ensure reliable positioning of the elements upon the steps thereof.

The mandrel for manufacturing multilayer windings with ferromagnetic elements between its layers can be made in the form of an axially magnetized permanent magnet.

The same mandrel can also be made ferromagnetic elements between is layers may also be made in the form of a radially magnetized permanent magnet.

It is expedient that the mandrel be made of a non-magnetic material and have linear permanent magnets in each step thereof in a quantity equal to that of the ferromagnetic elements of the layer which is placed upon that step, which are installed flush with the lateral surface of the step along the mandrel, linear permanent magnets in adjoining steps facing one another with their analogous poles.

It is also expedient that the magnetic mandrel for manufacturing multilayer winding be made as an electromagnet whose winding is arranged inside the mandrel.

It is desirable that the mandrel, in the form of an electromagnet, be made of a ferromagnetic material, with open longitudinal grooves passing through all the steps at portions meant for the positioning of the ferromagnetic elements. The winding, which generates a magnetic field for the positioning of the elements upon the steps of the mandrel, as it is connected to a direct current soource, can be placed in the grooves.

It is expedient that provision be made for an apparatus for manufacturing multilayer windings with ferromagnetic elements between the layers with the proposed mandrel of any described version thereof, which comprises, according to the invention, a mechanism for placing the ferromagnetic elements, designed for placing ferromagnetic elements upon the surfaces of the steps of the mandrel, and a mechanism for assembling the multilayer windings from separate layers thereof with respective ferromagnetic elements and for molding those windings with the elements between their layers, the mechanisms alternately interacting with the mandrel, as well as a drive kinematically coupled with the mechanisms.

It is desirable that the placing mechanism of the proposed apparatus comprise a carriage kinematically linked to the drive, which envelops the mandrel and is capable of moving therealong, and a feeder for the elements arranged in the carriage for piece-by-piece feeding of the elements in the course of the placing thereof on the surface of the mandrel steps as the carriage moves along the mandrel.

The proposed feeder can be made in the form of at least one holder of a non-magnetic material, installed movably and transverse, in relation to the mandrel, in grooves of the carriage so that the holder is capable of interacting with the lateral surface of the mandrel. At its base, the holder can be provided with an opening whose transverse dimensions correspond to those of a ferromagnetic element, so that the latter are fed, piece by piece, in the course of the placing thereof upon the surfaces of the steps of the mandrel.

It is expedient that the assembling and molding mechanism comprise a female die which is movable and coaxial with the mandrel and is arranged on the side of the end face of the lower step of the mandrel, at least two male dies, one thereof being designed to mold the end surface of the winding and being installed so that it is capable of moving reciprocally along the mandrel, whereas the second male die is meant for molding the lateral surface of the winding and is installed beyond the lower step of the mandrel and is capable of a reciprocating motion in a direction transverse to the mandrel, a container for an adhesive compound communicating with a molding space between the female die and the lower step of the mandrel, and a heater for the multilayer winding once impregnated with the compound, which accelerates polymerization of the adhesive compound.

The male die for molding the end surface of the winding may be made as a series of U-shaped forks, each of these being movably mounted upon an end surface of the carriage of the placing mechanism, facing the female die, the leg of each fork being disposed in longitudinal grooves of the mandrel, whose depth at the higher step is approximately equal to the height of the multilayer winding.

It is expedient that the female die of the proposed assembling and molding mechanism comprise two molding surfaces, one thereof being a continuation of the lower step of the mandrel and having the same shape and geometrical dimensions, the other being arranged transversely to and at the end of the first molding surface, a cavity being provided in the body of the female die that serves as a container for the adhesive compound to impregnate the winding in the course of its being molded, the other molding surface facing the molding space and being provided with a holder which is a guide for the male die arranged therein, for molding the lateral surface of the multilayer winding, and has openings through which the adhesive compound may be fed from the cavity to the molding space.

It is also expedient that in the proposed assembling and molding mechanism the multilayer winding with the ferromagnetic elements between its layers serves as the heater, being placed on the female die and connected to an alternating current source.

The present invention will hereinafter be explained in greater detail with reference to specific embodiments of the proposed mandrel and the apparatus, for manufacturing multilayer windings with ferromagnetic elements between the layers, taken in conjunction with the accompanying drawings, wherein:

FIG. 17 shows the process of placing ferromagnetic elements upon the steps of the mandrel of the proposed apparatus. Of the great variety of multilayer windings with ferromagnetic elements between their layers, whose manufacture requires the inventive mandrel or the apparatus including the same, we shall consider a winding with elements between the layers, which is a section of a stator of an electric machine (motor or generator). The winding makes it possible to give one a clearer idea of specific, exemplary embodiments of the mandrel and the apparatus for manufacturing that multilayer winding, which embodiments are described below.

The winding comprises four layers 1 (FIGS. 1 and 2) of a conductive material with ferromagnetic elements 2 made in the form of rectangular plates of electrical sheet steel.

Figure 1:
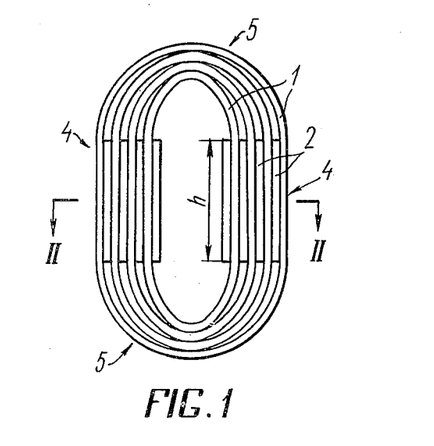
FIG. 1 shows an example of a multilayer winding with ferromagnetic elements betweein its layers, whose manufacture calls for the proposed mandrel or the proposed apparatus including that mandrel.
Figure 2:
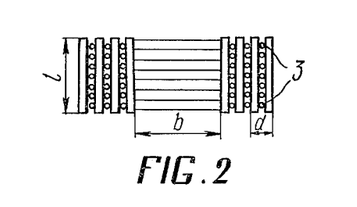
FIG. 2 shows the same winding along line II—II of FIG. 1.

Each layer has seven coils 3.

The ferromagnetic elements 2 and portions 4 of the layers 1 restricted by these ferromagnetic elements make up an effective portion of the multilayer winding, which, in the present case, is a section of a winding of an electric machine, whereas portions 5 of the layers 1 beyond the ferromagnetic elements make up end portions of the section of the electric machine winding.

In one of the specific embodiments, the mandrel for manufacturing the above multilayer windings with ferromagnetic elements between their layers has a lateral surface 6 (FIGS. 3 and 4) made up by descending steps 7 through 10.

The number of steps has to be equal to that of the layers of the multilayer winding being manufactured; in the present case, it is four, as the multilayer winding to be manufactured, shown in FIGS. 1 and 2, has four layers 1. The geometrical dimensions and the shape of the lateral surface of each step 7 through 10 (FIGS. 3 and 4) correspond to those of the layer placed upon this step, with its ferromagnetic elements, of the winding being manufactured.

For example, for the step 9 of the mandrel, the transverse dimension B, the dimension H and the length L, as well as the height D of the proceeding step have to be approximately equal to the respective dimensions $b$, $h$, $l$ and $d$ (FIGS. 1 and 2) of the multilayer winding being manufactured.

Figure 3:
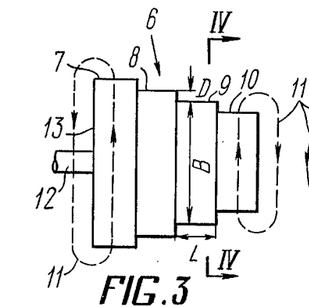
FIG. 3 is a simplified side view of a mandrel which is magnetic, in the form of a solid permanent magnet.
Figure 4:
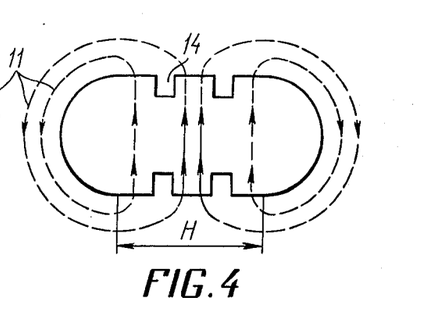
FIG. 4 shows the same mandrel along line IV—IV of FIG. 3.

The given mandrel is made magnetic, in the form of a solid permanent magnet of a magnetic material with a great coercive force value, which, after it is magnetized, makes for substantial intensity of the magnetic field whose configuration is shown by magnetic lines 11 (FIGS. 3 and 4).

The intensity of the magnetic field is determined according to the generally known methods of calculating permanent magnets, so that the ferromagnetic elements placed upon respective portions of the steps 7 through 10 of the mandrel (for the step 9, this portion being limited by the dimension H) are reliably held upon them by magnetic forces not only in the stable position of the mandrel, but also in the course of its rotation. Obviously, the magnetic force acting upon each ferromagnetic element has to exceed the joint action of the force of gravity (the weight) of this ferromagnetic element and the centrifugal force acting upon that element as it relates together with the mandrel. The mandrel has a longitudinal shaft 12 rigidly fixed thereto in the center of an end face 13 of the higher step 7. With the aid of that shaft, the mandrel may be mounted upon any drive (manual or mechanical) in order to ensure its rotation while the multilayer winding is wound.

According to another method of manufacturing multilayer winding, when it is wound around a fixed mandrel with the aid of the same shaft 12, the mandrel may be mounted in a fixed position upon any base. Longitudinal grooves 14 are meant to assemble a multilayer winding, after all of its layers have been wound around the mandrel, by fitting these layers one over another. Owing to the presence of the grooves 14, this may be done with the aid of any simple attachment, for example, U-shaped forks. Apparently, the groove must be deep enough so that in each step 7 through 10 its bottom not be higher than the level of the respective outer surface of the lower step 10.

In this embodiment of the mandrel, the bottom of each groove 14 is at the same level as the outer surface of the respective portion of the lower step.

Figure 5:
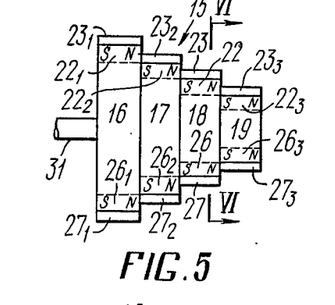
FIG. 5 shows a simplified side view of a mandrel with permanent magnets provided in each step thereof.
Figure 6:
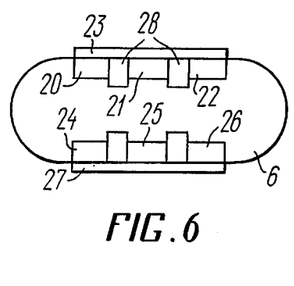
FIG. 6 shows the same along line VI—VI of FIG. 5.

Another embodiment of the mandrel, which is magnetic, in the form of a permanent magnet, is a mandrel for manufacturing multilayer windings with ferromagnetic elements between the layers, as shown in FIGS. 5 and 6.

This mandrel has a lateral surface 15 made up by four ascending steps 16 through 19.
The geometrical dimensions and the shape of each of these four steps correspond to those of the layers placed upon these steps, with respective ferromagnetic elements of the winding being manufactured.

In contrast to the first embodiment discussed above, this mandrel is made of a non-magnetic material and has in each step thereof linear permanent magnets 16 and 17 with a great coercive force. Each linear permanent magnet is disposed flush with the lateral surface of the respective step, along the mandrel.

In this case, the linear permanent magnets in adjoining steps have their analogous poles directed to one side. In the present embodiment, there are two groups of linear permanent magnets upon each step. One group consists of three magnets 20, 21 and 22 arranged where one ferromagnetic element 23 is to be located; the second group also consists of three magnets 24, 25 and 26 arranged where another ferromagnetic element 27 is to be located.

Permanent magnets are installed in a similar manner in the other steps, 16, 17 and 19 FIG. 5 shows permanent magnets $22_1$, $22_2$ and $22_3$ of the steps 16, 17 and 19, corresponding to the permanent magnet 22 upon the step 19, and permanent magnets $26_1$, $26_2$ and $26_3$ of the steps 16, 17 and 19, corresponding to the permanent magnet 26 of the step 18.

FIG. 5 also shows ferromagnetic elements $23_1$, $23_2$, $23_3$, $27_1$, $27_2$ and $27_3$ located on the steps 16, 17 and 19.

This mandrel also has longitudinal grooves 28 meant to assemble a multilayer winding, after all its layers have been wound around the mandrel, by fitting these layers one over another with the aid of an appropriate attachment, for example, U-shaped forks. The depth of the grooves 28 is selected so that the bottom of each groove is at the same level with the outer surface of the respective portion of the lower step 19 of the mandrel.

The use of linear permanent magnets mounted on the steps of the mandrel, instead of magnets of some other shape, is largely due to the fact that permanent magnets as required with a great coercive force are normally made of hard alloys which do not easily lend themselves to mechanical processing. For that reason, the use of permanent magnets of a more complicated design would substantially raise the cost of the mandrel.

The presence of the longitudinal grooves 28 determines both the longitudinal positioning of the linear permanent magnets upon each step and the number of these magnets (three linear permanent magnets are found in each place where a ferromagnetic element is to be located).

The arrangement of the linear permanent magnets in such a way that in adjoining steps they face one another with their analogous poles makes it possible to produce a configuration of the magnetic field which makes for the most accurate positioning of ferromagnetic elements upon the steps of the mandrel. This becomes absolutely clear after one considers schematic representations of the given mandrel, covering two possible ways of longitudinal arrangement of linear permanent magnets upon its steps.

Figure 7:
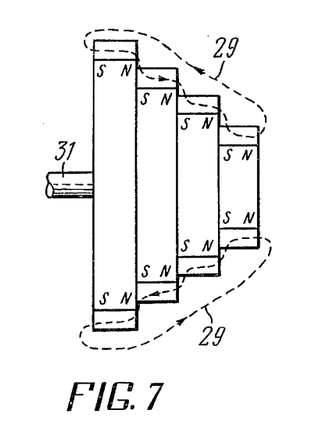
FIG. 7 shows a simplified view of a mandrel with permanent magnets in adjoining steps facing one another with their opposite poles.

In the first case, linear permanent magnets are so arranged upon the steps of the mandrel that in adjoining steps, these magnets face one another with their opposite poles.

The configuration of the magnetic field in this case is roughly as is shown by magnetic lines 29 (FIG. 7). In this embodiment, the entire system of permanent magnets arranged on one side of the lateral surface of the mandrel (in the drawing, it is at the top), in fact, makes up one permanent magnet which generates a common stray flux around the mandrel. Following the placing of ferromagnetic elements upon the steps of the mandrel, practically only a very small portion of the stray flux passes through these ferromagnetic elements.

It is clear that in this case one cannot hope for an accurate positioning of the ferromagnetic elements upon the mandrel steps.

Figure 8:
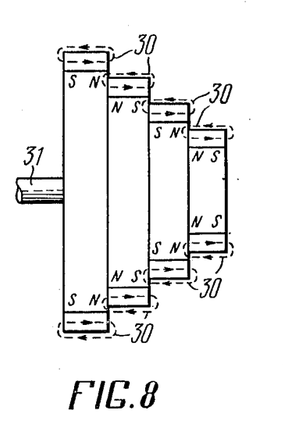
FIG. 8 shows the same, but with the magnets facing with analogous poles.

In the second case, the permanent magnets are arranged on the steps with their analogous poles facing one another.

In this case, the configuration of the magnetic field is roughly as is shown by magnetic lines 30 (FIG. 8).

In this embodiment, each linear permanent magnet on a respective step generates a magnetic field of its own, as well as a stray flux in the vicinity of that step.

In this case, following the placing of the ferromagnetic elements upon the steps of the mandrel, the stray flux of each linear permanent magnet is practically closed throuhg a respective ferromagnetic element. Clearly, this makes for accurate positioning of ferromagnetic elements upon the steps of the mandrel.

A shaft 31 (FIGS. 5, 7 and 8) makes it possible to kinematically link the mandrel with an appropriate drive, or, if the mandrel is to be fixed, to secure it upon an appropriate base.

A mandrel for manufacturing multilayer windings with ferromagnetic elements between the layers may, in accordance with the present invention, also be made magnetic, in the form of an electromagnet with the winding arranged inside the mandrel.

Figure 9:
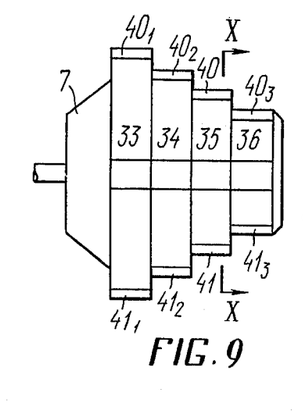
FIG. 9 is a simplified side view of a mandrel which is an electromagnet.
Figure 10:
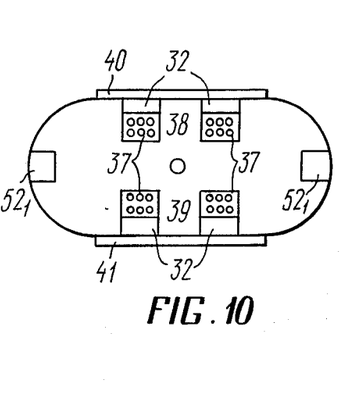
FIG. 10 shows the same along line X—X of FIG. 5.

Such a mandrel for manufacturing the multilayer winding shown in FIG. 1 and 2 is made of a ferromagnetic material and provided with open longitudinal grooves 32 (FIG. 10). This mandrel also has four steps, 33, 34, 35 and 36 (FIG. 9), each meant to be wound around by a respective layer of the multilayer winding with its respective ferromagnetic element.

Placed in the open longitudinal grooves 32 (FIG. 10) is a winding 37 which generates a magnetic field as electric current passes through it. This winding envelops cores 38 and 39 on those sides of the mandrel where ferromagnetic elements 40, $40_1$, $40_2$, $40_3$ (FIGS. 9 and 10) and 41, $41_1$, $41_2$, $41_3$ are to be placed on the steps thereof.

The same open longitudinal grooves 32 make it possible to assemble a multilayer winding from separate layers thereof after these have been coiled, with the use of an appropriate attachment, U-shaped forks, for example.

The depth of the open longitudinal grooves 32 must be such as to ensure that, following the placing in these grooves of the winding 33, the upper coils of this winding are lower than the level of the outer surface of the respective portions of the lower step 36 of the mandrel.

Figure 11:
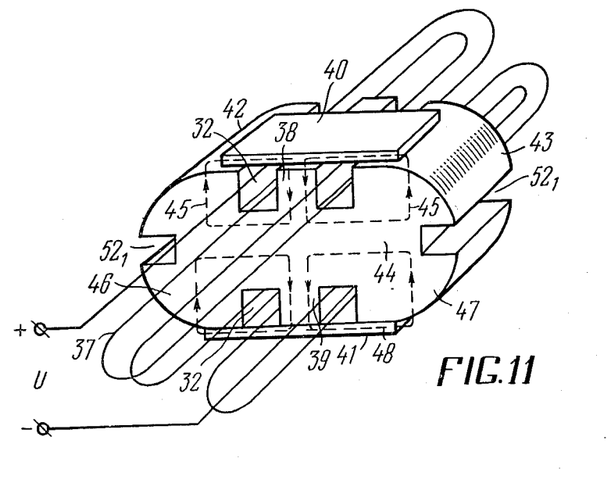
FIG. 11 shows one of the possible embodiments of the proposed mandrel, which is an electromagnet, with a power supply connected to the winding thereof, and a configuration of the magnetic field.

Such a mandrel determines the type of the magnetic circuit for the portion where the ferromagnetic element of each group is to be found, as is graphically shown in FIG. 11.

In this case, the magnetic circuit of the upper portion of the given step includes the cores 38, upper lateral portions 42 and 43, a middle portion 44 of the mandrel, and the ferromagnetic element 40 arranged upon the upper portion of the given step.

The configuration of the magnetic field, with the winding 37 being energized from a source of direct current at a voltage U, is shown by magnetic lines 45.

In a similar way, the magnetic circuit of the lower portion of the given step includes the core 39, lower lateral portions 46 and 47, the middle portion 44 of the mandrel, and the ferromagnetic element 41.

The configuration of the magnetic field in this case, with the winding 37 being energized from a source of direct current at a voltage U, is shown by magnetic lines 48.

Figure 12:
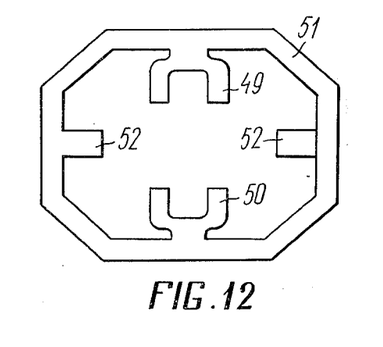
FIG. 12 is a simplified view of a possible attachment with U-shaped forks for assembly of multilayer windings from separate components.

U-shaped forks 49 and 50 (FIG. 12) for assembling a multilayer winding from separate layers thereof, after these have been coiled, may be conveniently arranged upon a common base 51 which is mounted upon the mandrel so that it is capable of moving in the longitudinal direction with the aid of projections 52 entering respective longitudinal grooves $52_1$.

The process of manufacturing a multilayer winding on all the above embodiments of the mandrel, according to the invention, is essentially the same. Hence, suffice it to consider this process with reference to one of the above embodiments. Described below is a process of manufacturing a multilayer winding with the use of the last embodiment among those mentioned above, whereby the mandrel is made as an electromagnet. The description is made in conjunction with FIGS. 9 through 12.

The process of manufacturing a multilayer winding includes the following operations. First, power is supplied to the winding 37. After that, the ferromagnetic elements 40 and 41 are placed upon respective portions of the steps 33 through 36 and fixed thereupon by the magnetic field.

Then, winding wire is coiled above the ferromagnetic elements 40 and 41, a layer of a multilayer winding being formed on each step. The coiling of the winding layers may be carried out in a consecutive order, passing from one step to another; it also may be carried out by simultaneously winding all the layers of the multilayer winding on all the steps of the mandrel (the latter being referred to as multigroove winding).

After the coiling of said layers is over, the latter are assembled with respective ferromagnetic elements by being fitted one over another in the direction of the lower step; simultaneously, the multilayer winding thus obtained is imparted the desired shape. The latter operation is done with the aid of an attachment shown in FIG. 12, whose projections 52 are disposed in grooves $52_1$ of the mandrel, which serve as guides; legs of the U-shaped forks 49 and 50 simultaneously enter the open longitudinal grooves 32, with the attachment moving in the direction of the lower step of the mandrel, all the layers with the respective ferromagnetic elements being assembled together on the lower step.

The winding is then impregnated with an adhesive compound; the impregnation process may be carried out layer by layer, before the winding is assembled from separate layers; all the layers may also be impregnated simultaneously, following the assembly of the winding.

After that, the winding is shaped and warmed up in order to accelerate the process of polymerization of the adhesive compound.

The warming up of the multilayer winding with the ferromagnetic elements between its layers, is effected by energizing it with alternating current at the expense of losses in the ferromagnetic elements.

If thermoplastic plastics are used as an insulating material for the multilayer winding, this excludes the operation of impregnating the winding with an adhesive compound.

Provision may be made, on the basis of the magnetic mandrels discussed hereinabove, for an apparatus for manufacturing the multilayer windings, which allows a complete cycle of manufacturing said multilayer windings to be performed, from the placing of the elements upon the steps of the mandrel to the shaping of the obtained winding. In the course of this process, the mandrel, in accordance with the invention, be it made as a permanent magnet or an electromagnet, is provided with a mechanism for placing the ferromagnetic elements on the surfaces of the steps thereof, and a mechanism for assembling and molding the winding, which alternately interact with the mandrel.

Considered below is a specific embodiment of an apparatus for manufacturing multilayer windings with ferromagnetic elements between the layers, which are coil groups of a grooveless stator of an electric machine (motor or generator). This apparatus comprises a mandrel 53 (FIG. 13), with which interact a mechanism 54 for placing ferromagnetic elements 55 and 56 upon the surfaces of its steps 57, a mechanism 58 for assembling a multilayer winding from its separate layers with the respective ferromagnetic elements 55, and for 56 between these layers and molding that winding, as well as drive kinematically linked to the mechanisms 54 and 58 and to the mandrel 53.

The mandrel 53 is made of a ferromagnetic material and has nine ascending steps $57_1$–$57_9$, each step having two portions 59 and 60 (FIG. 14) corresponding to effective portions of the multilayer winding being manufactured, which is a coil group of a grooveless stator of an electric machine. The ferromagnetic elements 55 and 56, respectively, are mounted on the latter, and two portions 61 and 62 corresponding to end portions of the multilayer winding being manufactured. Arranged at the end faces of the mandrel 53 and rigidly fixed thereto are cups 63 and 64 made of a nonmagnetic material, the lateral surface of the cup 63 corresponding to the lateral surface of the higher step $57_1$ and being a continuation thereof, whereas the lateral surface of the cup 64 corresponds to the lateral surface of the lower step $57_9$ and is a continuation thereof.

The mandrel 53 is made rotary, for which purpose it is mounted, with the aid of a shaft 65 kinematically linked to the drive (not shown in FIGS. 13 and 14), upon a stationary table 66.

Figure 13:
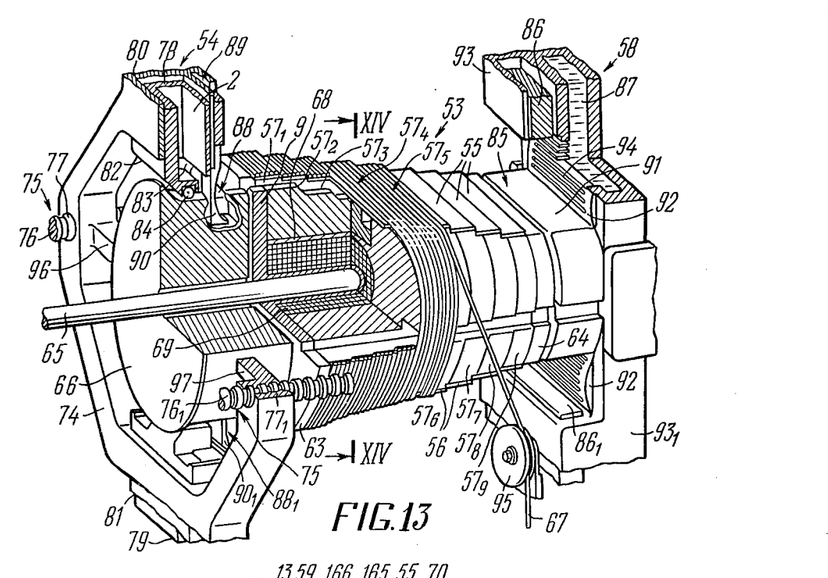
FIG. 13 shows an axonometrical view of an invention apparatus for manufacturing multilayer windings with ferromagnetic elements between the layers.
Figure 14:
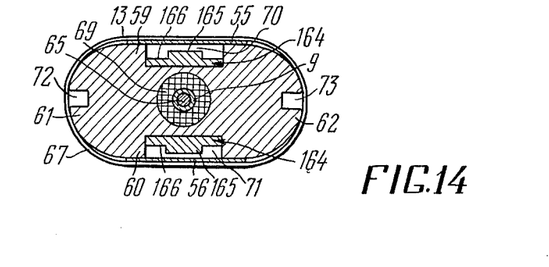
FIG. 14 shows the same along line XIV—XIV of FIG. 13.

The height of each step $57_1$–$57_9$ has to be somewhat greater than the outer diameter of a winding wire 67 from which a coil group of a grooveless stator of an electric machine is wound, the width of each step 57—57 being equal to that of the ferromagnetic elements 55 and 56. The mandrel 53 has a cavity 68, placed wherein is a winding 69 which generates, if energized with electric current, a magnetic field for the fixation of the ferromagnetic elements 55 and 56 on the portions 59 and 60 of the steps $57_1$–$57_9$ of the mandrel 53. Thus, the mandrel 53 is an electromagnet.

Apparently, the winding 69 becomes dispensable if the mandrel is made magnetic in the form of a permanent magnet. The mandrel 53 has open longitudinal grooves 70 and 71 at the portions 59–60, meant for the positioning and fixation of the ferromagnetic elements 55 and 56, as well as longitudinal grooves 72 and 73 whose purpose is discussed below.

The mechanism 54 for the placing of the ferromagnetic elements 55 and 56 upon the srfaces of the steps 57 of the mandrel 53 comprises a carriage 74 enveloping the mandrel 53 and being capable of moving longitudinally along the mandrel 53. The longitudinal motion of the carriage 74 is effected by screw gears 75 comprising screws 76, $76_1$ and interacting with respective threaded holes provided in the carriage 74. In the latter, there is a feeder for piece-by-piece feeding of the elements 55 and 56, as these are being placed on the surfaces of the steps $57_1$–$59_9$ of the mandrel 53.

The feeder comprises two holders 78 and 79 made of a non-magnetic material, in the present case, of brass. These holders are movable in grooves 80 and 81, respectively, the interact with the lateral surface of the mandrel, as the carriage 74 moves along it. Each of the holders 78 and 79 has at its base 82 an opening 83 for piece-by-piece feeding of the ferromagnetic elements 55 and 56.

Naturally, the dimensions of the opening 83 are to correspond to those of the ferromagnetic elements 55 and 56. At the base 72 of each holder, there are rollers 84, which are always in direct contact with the lateral surface of the mandrel 53. As a result, the movement of the carriage 74 along the mandrel 53 brings about a walking movement of each of the holders 78 and 79 along the steps $57_1$–$57_9$ of the mandrel 53. Each of the holders 78 and 79 is spring-loaded so that it is pressed to the lateral surface of the mandrel, which makes for continuous contact therewith of the rollers 84.

The mechanism for assembling the multilayer winding and molding the winding comprises: a female die 85 which is movable in a direction coaxial with the mandrel 53 on the side of the end face of the lower step $57_9$; male dies, one thereof, 86, being designed to mold the end face of the winding and is arranged so that it is capable of reciprocating movement along the mandrel 53, whereas the other die, $86_1$, is meant for molding the lateral surface of the winding and is located beyond the lower step $57_9$ of the mandrel 53, near the cup 64. A container 87 is provided in the mechanism for an adhesive compound, which communicates with a molding space disposed between the female die and the lower step $57_9$ of the mandrel 53, beyond the cup 64.

The male die 86 is made in the form of two U-shaped forks 88 and $88_1$, each being movably installed in the grooves 70 of the mandrel 53, legs $90_1$ of the second fork $88_1$ being disposed in the grooves 71 of the mandrel 53.

The shape of the surfaces of the forks 88 and $88_1$ facing the molding space corresponds to that of the end surface of the multilayer winding. In the present embodiment of the assembling mechanism, a reciprocating movement along the mandrel of the male die 86 is ensured by the fact that the U-shaped forks 88 and $88_1$ are mounted upon the carriage 74 of the described mechanism 54. It also has to be noted that the U-shaped forks 88 and $88_1$ are not only members to mold the end surface of the winding but also members that are directly used for the assembly of the multilayer winding from separate layers thereof with the respective ferromagnetic elements.

The female die 85 of the described mechanism 58 comprises two molding surfaces 91 and 92. The molding surface 91 is a continuation of the lower step $57_9$ of the mandrel 53; it is located beyond the cup 64 and has the same shape and geometrical dimensions as the lower step $57_9$ of the mandrel 53. The molding surface 92 is located at the end of the molding surface 91, transversely to the latter.

The molding surface 92 faces the molding space and is provided with holders 93 and $93_1$ which serve as guides for the male dies 86 and $86_1$ arranged therein, and has openings 94, wherethrough the adhesive compound may be fed to the molding space from the container 87, which is a cavity provided in the body of the female die 85.

In the present embodiment of the mechanism 58 for the assembly of multilayer windings from separate layers thereof with their respective ferromagnetic elements 55 and 56, the heater is the winding itself that is being manufactured, when it is in the molding zone and is connected, during the molding, to a source of alternating current. Heat in this case is liberated due to induction losses in the ferromagnetic elements 55 and 56 and in the body of the female die 85.

A wire placer 95 serves for winding the coiled wire 67 above the ferromagnetic elements 55 and 56 on the steps 57 of the mandrel 53. The longitudinal grooves 72 and 73 of the mandrel 53 serve as guides for the carriage 74 and are entered by projections 96 and 97 of the latter, respectively.

The mandrel 53, the screws 76, the U-shaped forks 88 and $88_1$, the male dies 86 and $86_1$, the wire placer 95 and the female die 85 are all kinematically linked to a drive which ensures operation of the apparatus with the required interaction, at a preset sequence, of all its mechanisms and kinematic units.

The drive of the the proposed apparatus comprises, in one of the specific, exemplary embodiments, a mechanism 98 (FIG. 15) for transfer of the carriage 74, mechanisms 99 and $99_1$ for transfer of the U-shaped forks 88 and $88_1$, mechanisms 100 and $100_1$ to drive the male dies 86 and $86_1$, a mechanism 101 to drive the female die 85, an electric motor 102 for the mandrel, and a control unit.

Figure 15:
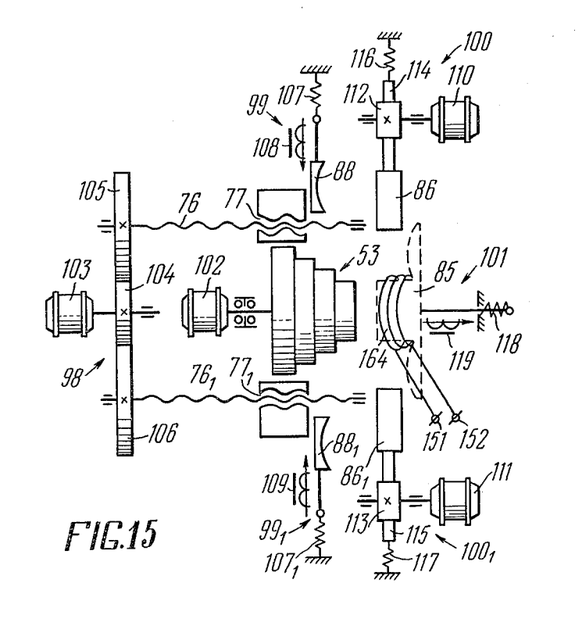
FIG. 15 is a functional diagram of the apparatus.

The mechanism 98 is provided with an electromotor 103 directly coupled to a gear 104 of a gear drive, driven gears 105 and 106 thereof being coupled to the screws 76 and $76_1$ which form screw pairs with the threaded holes 77 and $77_1$.

The mechanisms 99 and $99_1$ comprise springs 107 and $107_1$ which move the U-shaped forks 88 and $88_1$ away from the mandrel, and electromagnets 108 and 109 which, when energized, introduce the forks 88 and $88_1$ into the longitudinal grooves 70 and 71 of the mandrel 53.

The mechanisms 100 and $100_1$ comprise electric motors 110 and 111, gears 112 and 113 directly coupled to the electric motors 110 and 111, respectively, and toothed racks 114 and 115 which are thrown into gear with the gears 112 and 133, respectively, and are directly coupled to the male dies 86 and 86₁ which, in turn, are biased (by springs 116 and 117), which enables the male dies to resume their initial position.

The mechanism 101 for transfer of the female die 85 has a spring 118 which moves the female die toward the end face of the mandrel 53, and an electromagnet 119, which, when energized, moves the female die away from the mandrel, in order to produce a clearance through which the finished multilayer winding can be removed from the apparatus.

The control unit comprises a drum controller 120 (the drawing showing an unfolded view thereof) which is driven by an electric motor 121. The drum controller 120 is made as a drum 122 of an insulating material; placed upon the lateral surface thereof are segments 123 through 135 of a conductive material, for example, copper. Arranged opposite each segment, one below another, are stationary brush contacts 136 through 146. In addition, there are clips or terminals 147 and 148 for connecting a source of direct current, clips 149 and 150 for connecting a source of alternating current, and clips 151 and 152 for the winding being manufactured to be connected thereto for heating. A switch 153 serves to activate the electric motor 121 of the drum controller 120.

Figure 16:
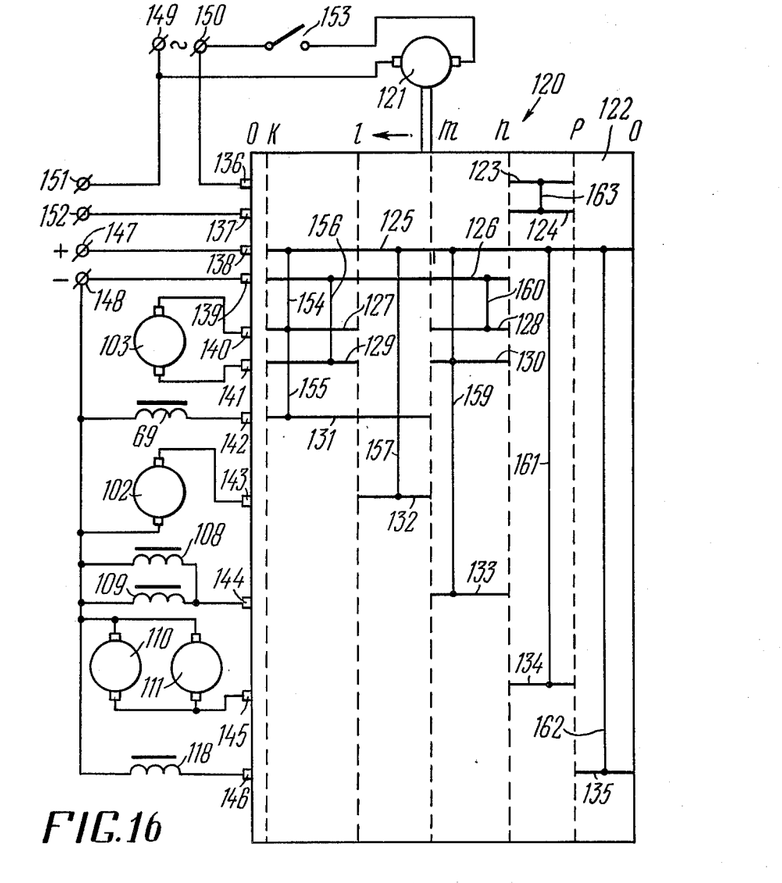
FIG. 16 is a key diagram of the control unit.

The segments 123 through 135 are electrically connected to one another, in a certain combination, by conductors 154 through 163. FIG. 16 shows all these connections. The segments 123 and 124, for example, are connected by the conductor 163; the segments 125 and 127 are connected by the conductor 154; the segment 127, in turn, are connected to the segment 131 by the conductor 155, etc.

The above description practically takes care of all the basic components of the proposed apparatus, in its static condition, as well as of the interconnections of these components by way of the respective electrical, mechanical and kinematic links. A detailed analysis has also been made of the purpose of each component described above. Some of these components, of which only passing mention has been made, will be considered in greater detail hereinafter, in the course of describing the operation of the inventive apparatus.

The exemplary embodiment of the apparatus proposed for manufacturing multilayer windings with ferromagnetic elements between their layers operates as follows.

In an initial position, the carriage 74 is in an extreme position beyond the lower step 57₉ of the mandrel 53. The drum controller 120 is in a fixed initial position when the stationary brush contacts 136 through 146 touch the drum along the line 0, as is shown in FIG. 16. No power is supplied to the electric motors 102, 103, 110 and 111, the electromagnets 108, 109 and 116, and the winding 69.

The switch 153 is in the off position, so no current is fed to the electric motor 121; hence, the drum controller 120 does not rotate. The ferromagnetic elements 55 and 56 are placed into the holders 78 and 79, respectively. The wire placer 95 is moved to an extreme position at the beginning of the higher step 57₁ of the mandrel 53.

To simplify the drawing, it does not show the mechanism for transfer of the wire placer. However, known is a great variety of mechanisms for wire placers for all types of winding machines; any of these may be used in the proposed apparatus without any modifications. It may be, for example, a screw gear with a split nut, which may be thrown into gear with a respective screw, when the wire placer has to be brought into action, or put out of gear with that screw, when the wire placer has to be stopped.

This screw gear may either have an electric motor of its own, or be kinematically linked with the electric motor 102 of the mandrel 53. The control of the transfer mechanism may be effected from the drum controller 120 if provided with respective additional segments and stationary brush contacts.

Under the action of the springs 107 and 107₁, the forks 88 and 88₁ are drawn away from the mandrel 53; the legs 90 and 90₁ of these forks are moved out from the longitudinal grooves 70 and 71, respectively.

Under the action of the springs 116 and 117, the male dies 86 and 86₁ are placed in an extreme position, farthest from the molding surface 91. Under the action of the spring 118, the female die 85 is drawn to the mandrel 53 on the side of the lower step 57₉ thereof and is next to the cup 64.

With the switch 153 placed in the on position, the electric motor 121 rotates and brings into rotation the drum 122 of the drum controller 120, so that portions $k, l, m, n, p, o$ of the drum 122 reach, in the above order, the locations of the brush contacts 136 through 146 (the direction of the motion of the drum controller is shown in FIG. 16 by an arrow). At the moment the portion $k$ of the drum 122 reaches the locations of these contacts, the brush contacts 133, 139, 140, 141 and 142 are brought into contact with the segments 125, 126, 127, 129 and 131, respectively.

This closes the electric circuit of the winding 69 of the mandrel 53, so that a current passes through it from the positive pole + of the direct current source, which proceeds via the clip or terminal 147, the brush contact 133, the segment 125, the jumpers 154 and 155, the segment 131, the brush contact 142, the winding 69 of the mandrel 53, the clip 148, to the negative pole − of the direct current source. A magnetic field is generated, which is indispensable for the fixation of the ferromagnetic elements 55 and 56 on the steps 57₁-57₉.

At the same time, the electric circuit is completed for the electric motor 103 of the mechanism 54 so that the current passes through it from the positive pole + of the current source, via the clip 147, the brush contact 138, the segment 125, the jumper 127, the brush contact 140, the electric motor 103, the brush contact 141, the segment 129, the jumper 156, the segment 126, the brush contact 139, the clip 148, to the negative pole − of the current source. The carriage 74 moves in the direction of the table 66. The ferromagnetic elements 55 and 56 are released, piece by piece, from the holders 78 and 79 of the feeder and placed, in consecutive order, beginning with the lower step, upon the steps 57₁-57₉ of the mandrel 53.

Figure 17:
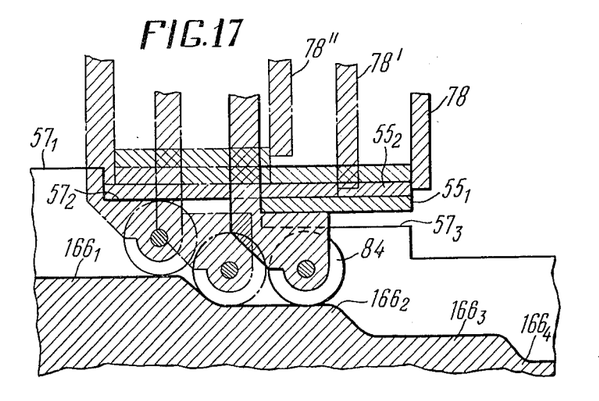

Described in greater detail hereinafter is the process of placing the ferromagnetic elements, as the carriage moves from the step 57₃ to the step 57₂ of the mandrel 53. In order to ensure the required interaction of all the components of the feeder with the holders 78 and 79 in the course of distributing the ferromagnetic elements 55 and 56, there are inserts 164 in the grooves 70 and 71, which is stepped, with its middle portion 165 protruding over lateral portions 166. The height and width of this insert, as well as the number of steps in the middle portion of each insert 164, correspond to those of the mandrel 53.

In the present specific embodiment, the shape of the inserts 164 is determined by that of the U-shaped forks 88 and $88_1$, as well as by the presence of the rollers 84, whereupon the holders 78 and 79 may roll along the mandrel 53.

FIG. 17 shows only the upper portion of the mandrel 53 with the steps $57_1$, $57_2$, $57_3$ and $57_4$ to which correspond the steps $166_1$, $166_2$, $166_3$ and $166_4$ of the portion 166 of the insert 164.

All the nine steps of the portion 166 including the four steps $166_1$, $166_2$, $166_3$ and $166_4$, shown in FIG. 17 are displaced in relation to the respective steps $57_1$–$57_9$ along the mandrel 53 approximately by one half of the step spacing. This ensures a release from the holder 78 and placing upon each step $57_1$–$57_9$ of the mandrel 53 of only one ferromagnetic element 55.

When the carriage 74 is in a position at which the holder 78 is found precisely oppsite the steps $57_3$, the lower ferromagnetic element $55_1$ of those found in the holder 78 abuts against the end face of the step $57_2$; hence, with a further movement of the carriage 74, it is released through the opening 83 of the holder 78, placed upon said step $57_3$ and fixed thereupon by the magnetic field generated by the winding 69.

As this takes place, the next ferromagnetic element $55_2$ starts moving to the step $57_7$, whereas the rollers 84 continue to roll along the step $166_2$ until the holder 78 is in the position $78^1$ shown by the dotted lines. Then the rollers 84 start rolling onto the step $166_1$; as this takes place, the holder 78 is lifted and, with further movement of the carriage 74, is found in the position 78'' shown by a dotted line; the next ferromagnetic element $55_2$, which is at the bottom portion of the holder 78, is now above the step $57_2$ of the mandrel 53 and subsequently, abutting against the end face of the step $57_1$, of the mandrel 53, comes out through the opening 83 of the holder 78, is placed upon said step $57_2$ and fixed thereupon by the magnetic field generated by the winding 69.

The placing of the other ferromagnetic elements 55 and 56 on all the steps $57_1$–$57_9$ of the mandrel proceeds in a similar manner. Following the placing of all the elements 55 and 56, the carriage 74 continues to move, the holders 78 and 79 leave the grooves 70 and 71 of the mandrel 53 and move onto the table 66. At this moment, the portion *l* of the drum 122 reaches the location of the brush contacts 136 through 146; the brush contacts 140 and 141 are not drawn away from the segments 127 and 129, the electric motor 103 is switched off, and the carriage 74 stops.

The end of the winding wire 67 is fixed at the beginning of the higher step $57_1$ of the mandrel 53. As the drum 122 continues to rotate, the brush contact 143 comes into contact with the segment 132. This closes the electric circuit of the electric motor 102, so that current passes through it from the positive pole + of the direct current source, via the clip or terminal 147, the brush contact 138, the segment 125, the jumper 157, the segment 132, the brush contact 143, the electric motor 102, to the negative pole − of the direct current source.

The mandrel 53 starts rotating, which results in the winding of the layers of the multilayer winding being manufactured, which is done in a consecutive order, from the upper layer wound on the steps $57_1$, to the lower layer wound around the steps $57_9$. In the process of the winding of the multilayer winding, the brush contact 142 continues sliding along the segment 131; current continues to flow across the winding 69, and the ferromagnetic elements 55 and 56 are fixed by the magnetic field thus generated upon the steps $57_1$, $57_9$ of the mandrel 53.

It should be noted that in the exemplary embodiment of the proposed apparatus, rotation is imparted to the mandrel 53, yet other solutions are also possible, whereby the mandrel is made stationary, with the wire placer 95 rotating around the mandrel, moving at the same time in the longitudinal direction.

The winding phase being over, the portion *m* of the drum 122 reaches the location of the brush contacts 136 through 146, the brush contacts 142 and 143 are drawn away from the respective segments 131 and 132, a the electric motor 102 is switched off, and the mandrel 53 stops. The switching off of the winding 69 takes place simultaneously, which generates the magnetic field for the fixation of the ferromagnetic elements 55 and 56 upon the steps $57_1$–$57_9$ of the mandrel 53.

This moment is the beginning of the assembling process of the multilayer winding with the respective ferromagnetic elements. As the drum 122 continues to rotate, the brush contacts 140 and 141 come into contact with the segments 128 and 130; this closes the circuit of the electric motor 103, so current flows from the positive pole + of the direct current source, via the clip 147, the brush contact 133, the segment 125, the jumper 158, the segment 131, the brush contact 141, the electric motor 103, the brush contact 140, the segment 128, the jumper 160, the segment 126, the brush contact 139, to the negative pole − of the direct current source.

Since as an inductor (a means for producing a magnetic flux), the direct current motors 102, 103, 110, 111 and 121 may have permanent magnets or field windings directly connected to a direct current source, these inductors are not shown in the drawings; as regards the electric motors themselves, these are represented by their armature windings indicated by conventional symbols. Therefore, when it is said that current flows through one of the electric motors, it is to be understood that current flows through their armatures in the respective direction, and that a change in the direction of the current through the armature of an electric motor always leads to a change in the direction of the rotation thereof.

In the present case, as the segments 128 and 130 arrive to the location of the brush contacts 140 and 141, beginning with the position *m* of the drum 122, the current through the electric motor 103 flows in the opposite direction with reference to the direction thereof when the brush contacts 140 and 141 come into contact with the segments 127 and 129. The carriage 74 moves away from the table 66 in the direction of the female die 85. As the carriage 74 starts moving, the forks 88 and $88_1$, under the action of the electromagnets 108 and 109, approach the female die, and their legs enter the grooves 70 and 71.

This is due to the fact that the electric magnets 108 and 109 are energized by the current flowing through the following circuit: the positive pole + of the current source, the clip or terminal 147, the brush contact 138, the segment 125, the jumpers 158 and 159, the segment 133, the brush contact 144, the electromagnets 108 and 109, and the negative pole − of the direct current source.

As the carriage 74 moves on, the forks 88 and 88₁ are displaced in the grooves 70 and 71 of the mandrel 53; as a result, separate layers of the multilayer winding are manufactured, with their respective ferromagnetic elements 55 and 56, and they are placed one above another, so that each next layer enters the previous one.

The assembly is followed by the molding of the multilayer winding being manufactured which, at the end of the stroke of the carriage 74, is found upon the female die 85. The end surfaces of the winding are molded by being pressed by the forks 88 and 88₁ onto the molding surface 92 of the female die 85; the lateral surfaces of the winding are molded by means of the male dies 86 and 86₁ which are moved toward the molding surface 31 of the female die 85 by the electric motors 110 and 111, as soon as the portion $n$ of the drum 122 of the drum collector 120 reaches the location of the brush contacts 136 through 146.

The current through the electric motors 110 and 111 follows this current: the positive pole + of the direct current source, the clip or terminal 147, the brush contact 133, the segment 125, the jumper 161, the segment 134, the brush contact 145, the electric motors 110 and 111, the clip 148, and the negative pole − of the direct current source.

Simultaneously with the process of molding the multilayer winding, after it has been pressed by the forks 88 and 88₁ to the molding surface 92 of the female die 85, but before the beginning of the transfer of the male dies 86 and 86₁ in the direction of the molding surface 91 of the female die 85, i.e. before the molding of the lateral surface of the winding starts, an adhesive compound is fed from the container 87 via the openings 94 of the molding surface 92, which impregnates all the components of the multilayer winding.

Naturally, to prevent the adhesive compound from leaking from the container 87 into the molding space when the latter is vacant, meaning that it is not yet occupied by the multilayer winding, the openings 94 in the molding surface 92 are closed by appropriate shutters (not shown in the drawings). These shutters interact with the multilayer winding only in the process of the latter being pressed by the forks 88 and 88₁ to the molding surface of the female die 85. Due to this interaction of the shutters with the multilayer winding the openings 94 is exposed, thus communicating the container 87 with the molding space. As a result, the adhesive compound is fed from the container to the winding which, at this time, is in the molding space.

As the molding of the lateral surface of the winding takes place in the course of the motion of the male dies 86 and 86₁ toward the molding surface 91 of the female die 85, the winding is heated, which substantially accelerates the process of polymerization of the adhesive compound. The heating of the winding is effected at the expense of induction losses in the ferromagnetic elements 55 and 56 and in the body of the female die 85, as the winding is connected to an alternating current source when the portion $n$ of the drum 122 reaches the location of the brush contacts 136 through 146. As this takes place, the electric current flows through the following circuit: the clip or terminal 149, the brush contact 136, the segment 123, the conductor 154, the segment 124, the brush contact 137, the clip 152, the winding 164 being manufactured, the clip 151, and the clip 150.

In the described apparatus, the cutting of the winding wire 67 next to the wire placer is done by hand, following the winding of the layers and the assembly from these layers of the winding with the elements between the layers. This equally applies to the operations of stripping the insulation off the leadouts of the winding and connecting them to the clips 151 and 152. It is not difficult, however, to mechanize and automate such elementary operations, by using widely know methods employed in manufacturing various types of wound articles, for example, additional resistors for measuring instruments, when they have to be periodically connected in the winding process to a measuring circuit in order to check their electric resistances.

The final stage of manufacturing the multilayer winding with the ferromagnetic elements between its layers begins at the moment when the portion $p$ of the drum 122 reaches the location of the brush contacts 136 through 146. As this takes place, the electric current proceeds through the electromagnet 119 of the female die 85 along the following circuit: the positive pole + of the direct current source, the clip or terminal 147, the brush contact 145, the segment 134, the conductor 163, the segment 135, the brush contact 146, the electromagnet 119 of the female die 85, the clip 148, and the negative pole − of the current source. The female die 85 is drawn away from the mandrel 53, and the multilayer winding 164 may be removed therefrom.

The described embodiment of the inventive mandrel and apparatus for manufacturing multilayer windings with ferromagnetic elements between the layers has been evolved, built and tested in the application to a multilayer winding with ferromagnetic elements between the layers thereof, specifically in manufacturing coil groups of a grooveless stator of an electric machine (motor or generator) invented by V. M. Kazansky (cf. the disclosure pertaining to the respective USSR Inventor's Certificate published in the official Bulletin of the Committee for Inventions and Discoveries under the Council of Ministers of the USSR, No. 26 for 1970).

The here proposed apparatus, with reference to the foregoing exemplary embodiment thereof, makes it possible to carry out the automatic assembly of coil groups of grooveless stators and, in the long run, the automatic manufacturing of electric machines themselves on a production line, when the initial components are in the form of winding wire and ferromagnetic elements, whereas the final product is a finished electric machine.

Naturally, the potentialities of the proposed mandrel and apparatus are not confined to the manufacturing of coil groups of grooveless stators. Such an apparatus may also be used in manufacturing diverse types of wound articles for a great number of electromagnetic apparatus. The only thing to be done is to give the steps of the mandrel the shape and dimensions corresponding to those of the particular wound articles being manufactured and to introduce appropriate modifications into the mechanism for placing the ferromagnetic elements upon the steps of the mandrel, and into the mechanism for assembling the windings from separate layers thereof.

What is claimed is:

1. A mandrel for the manufacture of a multi-layer winding with ferromagnetic elements placed between layers thereof; the mandrel comprising a lateral surface defined by a succession of descending steps, the number of the latter being equal to that of said layers of the winding; each of said steps having surfaces with geometric dimensions and shapes of said lateral surfaces that correspond to those of said layers, placed upon each said step with a respective one of said ferromagnetic elements; the mandrel having a configuration and strength of the magnetic field capable of reliably fixing said ferromagnetic elements on said lateral surfaces.

2. The mandrel as defined in claim 1, which is of the magnetic type, and comprising a body which is a permanent magnet.

3. The mandrel as defined in claim 1, which is of a non-magnetic material, further comprising linear permanent magnets in each of said steps, located at points where said ferromagnetic elements are to be disposed that belong to said layers of the winding that are placed upon those steps, said magnets being flush with said lateral surfaces of the steps, lengthwise of the mandrel.

4. The mandrel as defined in claim 1, which is of the magnetic type, further comprising an electromagnet made of a ferromagnetic material and having open longitudinal slots extending across all of said steps at places where said ferromagnetic elements are to be placed; said winding being inserted in said slots to produce, upon connection to an electric current source, the magnetic field for fixing said ferromagnetic elements upon said steps.

5. An apparatus for the manufacture of a multi-layer winding with ferromagnetic elements placed between layers thereof, wherein a mandrel for the winding has a lateral surface defined by a succession of descending steps, the number of the latter being equal to that of the layers, the stes having surfaces with geometric dimensions and shapes of the lateral surfaces that correspond to those of the layers, placed upon that step with a respective element; the mandrel having a configuration and strength of the magnetic field capable of reliably fixing the elements on the lateral surfaces; the apparatus comprising a mechanism for arranging the ferromagnetic elements on the surfaces of the mandrel steps; a mechanism for assembling the winding from its layers with their respective elements, and for molding the winding with the elements placed between its layers; and a drive operatively connected to said mechanisms.

6. The apparatus as defined in claim 5, wherein said arranging mechanism includes a carriage operatively connected to said drive and embracing the mandrel, and being capable of moving along the same; said carriage having slots therein; and a feeder disposed in said slots to feed the ferromagnetic elements one after the other, to distribute them over the surfaces of the mandrel steps as said carriage moves along the mandrel.

7. The apparatus as defined in claim 6, wherein said feeder includes at least one holder made of a non-magnetic material and movable in said slots of the carriage in a direction transverse to the mandrel, to engage the lateral surfaces of the latter, said holder having at its base an opening with transversal dimensions substantially corresponding to those of a ferromagnetic element, said opening serving to feed the elements one after the other.

8. The apparatus as defined in claim 6, wherein said assembling and molding mechanism includes a female die movable in a direction coaxial with the mandrel at the side of the end face of the bottommost step thereof; at least two male dies, one of them being reciprocable along the mandrel, for molding the end surface of the winding; while the other male die is mounted beyond the bottommost step of the mandrel and is reciprocable transversely to the latter, for molding the lateral surface of the winding; a container for an adhesive compound, communicating with a molding space defined between said female die and the bottommost step of the mandrel; and a heater to warm up the winding when impregnated with the adhesive compound, to speed up polymerization of the compound.

9. The apparatus as defined in claim 8, wherein at least one of said male dies includes a series of U-shaped forks movably mounted on the end surface of said carriage, which faces said female die; legs of said forks being located in longitudinal slots of the mandrel; the depth of these slots, at the topmost step, being approximately equal to the height of the winding.

10. The apparatus as defined in claim 8, wherein said female die has two molding surfaces, one of which is an extension of the bottommost step of the mandrel and has the same geometric dimensions and shape, while the other surface is located transversely to the end of said one molding surface; said female die having a body with a cavity therein, serving as said container for the adhesive compound, to impregnate the winding during its molding; said other molding surface facing said molding space and being provided with a holder serving as a guide for at least one of said male dies, for molding the lateral surfaces of the winding, and said other molding surface having slots therein through which the adhesive compound is fed from said cavity into said molding space.

11. The apparatus as defined in claim 8, wherein said heater is located on said female die and includes means for connecting the winding to an AC source.

* * * * *